United States Patent
Blevens et al.

(10) Patent No.: US 10,980,194 B2
(45) Date of Patent: Apr. 20, 2021

(54) SAW APPARATUS WITH CHAIN RETENTION

(71) Applicant: Deere & Company, Moline, IL (US)

(72) Inventors: Robert Blevens, Portland, OR (US); Douglas Craig Swinyard, Rotorua (NZ); Philip Waterhouse, Tokoroa (NZ)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/335,136

(22) PCT Filed: Sep. 21, 2017

(86) PCT No.: PCT/NZ2017/050123
§ 371 (c)(1),
(2) Date: Mar. 20, 2019

(87) PCT Pub. No.: WO2018/056842
PCT Pub. Date: Mar. 29, 2018

(65) Prior Publication Data
US 2019/0223393 A1    Jul. 25, 2019

(30) Foreign Application Priority Data

Sep. 21, 2016 (NZ) ............................... 724576
Mar. 14, 2017 (NZ) ............................... 730069
May 18, 2017 (FI) ................................ 20175449

(51) Int. Cl.
*A01G 23/083* (2006.01)
*B27B 17/02* (2006.01)
(Continued)

(52) U.S. Cl.
CPC ............ *A01G 23/083* (2013.01); *B27B 17/02* (2013.01); *B27B 33/14* (2013.01); *B27G 19/003* (2013.01)

(58) Field of Classification Search
CPC ......... B27B 17/02; B27B 33/14; B27B 17/00; B27B 17/08; B27B 33/147; B27G 19/003;
(Continued)

(56) References Cited

U.S. PATENT DOCUMENTS 2,007,806 A    7/1935  Logan
2,601,978 A *  7/1952  Simmons ................ E21C 25/28
                                                299/82.1
(Continued)

FOREIGN PATENT DOCUMENTS

DE    102012004049 A1    9/2013
RU        2066948 C1     9/1996
(Continued)

OTHER PUBLICATIONS

International Search Report for PCT/NZ2017/050123, dated Jan. 19, 2018, 3 pages.
(Continued)

*Primary Examiner* — Ghassem Alie
(74) *Attorney, Agent, or Firm* — Klintworth & Rozenblat IP LLP

(57) ABSTRACT

A saw apparatus includes a guide bar, a chain driver, and an endless cutting chain trained about the guide bar and the chain driver. The guide bar includes a first chain retention feature along at least a portion of its periphery, and the cutting chain includes a second chain retention feature configured to interact with the first chain retention feature such that movement of the second chain retention feature away from the guide bar is restricted. A timber-working
(Continued)

device includes a frame, at least one pair of arms pivotally attached to the frame and configured to be controlled to grasp at least one tree, and the saw apparatus mounted to the frame.

12 Claims, 12 Drawing Sheets

(51) Int. Cl.
*B27B 33/14* (2006.01)
*B27G 19/00* (2006.01)

(58) Field of Classification Search
CPC ..... B27G 23/091; B27G 19/00; Y10T 83/909; Y10T 83/263
USPC ...................... 83/830, 169; 29/428
See application file for complete search history.

(56) References Cited

U.S. PATENT DOCUMENTS

| | | | |
|---|---|---|---|
| 3,550,962 A | | 12/1970 | Goodrich |
| 3,854,510 A | * | 12/1974 | Matlik ................. A01G 23/091 144/34.1 |
| 3,910,709 A | | 10/1975 | Krekeler |
| 3,968,821 A | * | 7/1976 | Jonsson ............... A01G 23/091 144/34.1 |
| 4,081,009 A | * | 3/1978 | Curlett ................. A01G 23/091 144/339 |
| 2008/0011144 A1 | | 1/2008 | Harfst et al. |
| 2014/0047721 A1 | | 2/2014 | Fuchs |
| 2014/0123827 A1 | * | 5/2014 | Fuchs .................... B23D 65/00 83/830 |
| 2015/0122102 A1 | | 5/2015 | Engelfried et al. |

FOREIGN PATENT DOCUMENTS

| | | |
|---|---|---|
| WO | 2014092632 A1 | 6/2014 |
| WO | 2015038011 | 3/2015 |
| WO | 2015084183 A2 | 6/2015 |

OTHER PUBLICATIONS

Written Opinion of the ISA for PCT/NZ2017/050123, dated Jan. 19, 2018, 6 pages.

* cited by examiner

SAW APPARATUS WITH CHAIN RETENTION

CROSS-REFERENCE TO RELATED APPLICATIONS

The present application is a U.S. National-Stage entry under 35 U.S.C. § 371 based on International Application No. PCT/NZ2017/050123, filed 21 Sep. 2017 and claims the benefit of New Zealand Patent Application No. 724576, filed 21 Sep. 2016, New Zealand Patent Application No. 730069, filed 14 Mar. 2017, and Finnish Patent Application No. 20175449, filed 18 May 2017, the content of which are hereby incorporated by reference in their entirety.

TECHNICAL FIELD

The present disclosure relates to a saw apparatus including an endless cutting chain.

BACKGROUND

It is known to mount a timber-working head, for example in the form of a harvesting head, to a forestry work machine to perform a number of functions in connection with timber. Such heads may be used to grapple and fell a standing tree and process the felled tree by delimbing, possibly debarking (depending on the configuration of the head), and cutting the stem of the tree into logs of predetermined length using at least one chainsaw.

The endless cutting chain of the saw can be broken during sawing, potentially producing a whipping action which may cause fragments of the chain to be thrown at high speed (referred to in the art as "chain shot"). While a number of measures have been developed to reduce the likelihood of chain shot occurring (for example braking systems, control of chain tension, and guards), it remains highly desirable to further mitigate this issue.

Aspects and advantages of the present disclosure will become apparent from the ensuing description which is given by way of example only.

SUMMARY OF THE DISCLOSURE

According to an example embodiment of the present disclosure there is provided a saw apparatus including a guide bar, a chain driver, and an endless cutting chain trained about the guide bar and the chain driver. The guide bar may include a first chain retention feature along at least a portion of its periphery, and the cutting chain may include a second chain retention feature configured to interact with the first chain retention feature such that movement of the second chain retention feature away from the guide bar is restricted.

According to an example embodiment of the present disclosure there is provided a guide bar for a saw apparatus, the guide bar including a first chain retention feature along at least a portion of its periphery, wherein the first chain retention feature is configured to interact with a second chain retention feature of an endless cutting chain to be trained about the guide bar such that movement of the second chain retention feature away from the guide bar is restricted.

According to an example embodiment of the present disclosure there is provided a method of manufacturing a guide bar for a saw apparatus. The method may include the step of providing a first chain retention feature along at least a portion of the periphery of the guide bar, the first chain retention feature configured to interact with a second chain retention feature of an endless cutting chain to be trained about the guide bar such that movement of the second chain retention feature away from the guide bar is restricted.

According to an example embodiment of the present disclosure there is provided an endless cutting chain for a saw apparatus having a guide bar with a first chain retention feature along at least a portion of its periphery, wherein the endless cutting chain includes a second chain retention feature configured to interact with the first chain retention feature when the endless cutting chain is trained about the guide bar such that movement of the second chain retention feature away from the guide bar is restricted.

According to an example embodiment of the present disclosure there is provided a method of manufacturing an endless cutting chain for a saw apparatus having a guide bar with a first chain retention feature along at least a portion of its periphery. The method may include the step of providing a second chain retention feature on the endless cutting chain configured to interact with the first chain retention feature when the endless cutting chain is trained about the guide bar such that movement of the second chain retention feature away from the guide bar is restricted.

According to an example embodiment there is provided a timber-working device, including a frame, and a saw apparatus mounted to the frame. The saw apparatus may include a guide bar, a chain driver, and an endless cutting chain trained about the guide bar and the chain driver. The guide bar may include a first chain retention feature along at least a portion of its periphery, and the cutting chain may include a second chain retention feature configured to interact with the first chain retention feature such that movement of the second chain retention feature away from the guide bar is restricted. The timber-working device may include at least one pair of arms pivotally attached to the frame and configured to be controlled to grasp at least one tree stem. The timber-working device may include a feed mechanism configured to feed the at least one stem relative to the frame.

The guide bar may include an elongate body, and a nose at an end distal from the chain driver, as known in the art. Guide features, commonly referred to as rails, extend along the sides of the body and around the nose, for guiding the endless cutting chain along the guide bar. The nose may include a rotating nose sprocket to bear operational forces of the chain at the nose, rather than on the static rails. The chain driver may include a drive sprocket configured to be driven by a driver device (for example, a hydraulic motor) to urge the chain into movement.

In an example embodiment the chain retention features may include a complementary recess and protrusion. For completeness, it should be appreciated that reference to the recess and protrusion being complementary is intended to encompass embodiments in which the recess and protrusion are not precisely matched in shape, but remain capable of restricting relative movement outwardly of the guide bar.

For example, the first chain retention feature may include a main recess having at least one secondary recess transverse to the main recess. In such an example embodiment the second chain retention feature may include a protrusion extending from at least one link of the endless chain. In an example embodiment the first chain retention feature may include a T-slot, with the second chain retention feature including first and second protrusions extending in opposite directions from the chain. While the first chain retention feature may be referred to herein as a T-slot for ease of comprehension, it should be appreciated that the features may take other forms—for example, an L-slot, a dove tail profile, or another sliding fit shape having a negative slope.

Further, while the first and second chain retention features may be described herein as being recessed and protruding respectively, it should be appreciated that in example embodiments the converse configuration may be used.

In an example embodiment the first chain retention feature may extend along at least part of the sides of the body of the guide bar. In an example embodiment the first chain retention feature may be incorporated into the rails on the sides of the body of the guide bar. For example, where the first chain retention feature is a T-slot (or other shaped recess), the T-slot may form at least part of the rails of the body of the guide bar.

It should be appreciated that reference to the first chain retention feature being provided on the side of the guide blade (i.e. the surface facing the cutting direction of the saw apparatus) is not intended to be limiting to all embodiments, and that in example embodiments the first chain retention feature may be provided on at least one of the faces of the guide bar. By way of example, the first chain retention feature may include a ridge or groove along at least one face of the guide bar, and the second chain retention feature of the endless chain may include a feature overlapping the ridge or groove to resist relative movement.

In an example embodiment the first chain retention feature may extend along and around the nose of the guide bar. In an example embodiment the first chain retention feature may be incorporated into the rail on the nose of the guide bar. For example, where the first chain retention feature is a T-slot (or other shaped recess), the T-slot may form at least part of the rail of the nose of the guide bar.

However, in an example embodiment the nose of the guide bar may not include the first chain retention feature, or the first chain retention feature may only extend partially along the nose. It is envisaged that the distance along the nose for saw configurations known for use in forestry machine applications may be such that the length of broken chain permitted to whip around in the event of a break may be insufficient to produce the force conditions under which chain shot occurs. As such, in example embodiments the ease of installing the chain may be improved by only needing to locate the chain on an open rail at the nose, rather than requiring engagement with the first chain retention feature.

In an example embodiment the second chain retention feature may include at least one protrusion extending from a side of the chain. In an example embodiment the second chain retention feature may include at least one protrusion extending from both sides of the chain.

In an example embodiment the at least one protrusion of the second chain retention feature may be a stud. In an example embodiment the stud may be provided by press fitting a pin into an aperture of a link of the endless chain, to provide opposing studs on either side of the link.

In an example embodiment the at least one protrusion of the second chain retention feature may be a flange. The flange may be produced using any suitable manufacturing technique, for example a bending operation, or at the time of forming the link.

In an example embodiment the endless chain may include a plurality of links including, but not limited to, cutter links, drive links, bumper links, and/or tie straps. It is envisaged that the drive links of the endless chain may be suited to including the second chain retention, having a tang configured to protrude from the chain and be received by the rails of the guide bar and the gullets of drive and nose sprockets.

According to an example embodiment of the present disclosure there is provided a saw apparatus including a guide bar, a chain driver, and an endless cutting chain trained about the guide bar and the chain driver. The endless chain may include a plurality of cutter links, drive links, and tie straps. The guide bar may include a first chain retention feature along at least a portion of its periphery, and the cutting chain may include a second chain retention feature configured to interact with the first chain retention feature such that movement of the second chain retention feature away from the guide bar is restricted.

In example embodiments the endless chain may be provided with at least one coupling or master link configured to facilitate opening and closing of the endless chain. It is contemplated that this may facilitate installation through feeding of the chain onto the guide bar. Such master links may include a tie strap having at least one open end configured as a releasable clasp, fastener, or snap fitting, for connection to a rivet in the chain. It is envisaged that the master link may be configured to only permit installation in an orientation such that the open end faces away from the direction of travel in order to reduce the likelihood of separation. In example embodiments, particularly for use in which the saw apparatus is provided with self-tensioning functionality, it is envisaged that the tie strap of the master link may be configured as a double ended hook.

It should be appreciated that the second chain retention features may be spaced along the chain—for example, on alternating drive links, or any other desirable spacing. It is envisaged that the second chain retention features may be spaced apart by less than about 30 cm.

In an example embodiment, the second chain retention feature may be offset from at least surfaces of the first chain retention feature facing either towards and/or away from the periphery of the guide bar. For example, where the first chain retention feature is a T-slot and the second chain retention feature is opposing studs, the depth of the head of the 'T' may be greater than the diameter of the studs such that there is a gap on either side. In normal operation, where the chain is tensioned and drawn onto the guide bar, this may prevent friction on the studs and reduce the likelihood of them wearing down, or jamming. In an example embodiment the second chain retention feature may be offset from at least surfaces of the first chain retention feature substantially perpendicular to the periphery of the guide bar. In an example embodiment, the second chain retention feature may be offset from surfaces of the first chain retention feature facing either towards and/or away from the periphery of the guide bar and surfaces of the first chain retention feature substantially perpendicular to the periphery of the guide bar.

In an example embodiment the second chain retention feature may be movable relative to the link of the endless chain on which it is provided. In an example embodiment the second chain retention feature may be flexible—for example capable of being elastically deformed to assist with locating the second chain retention feature relative to the first chain retention feature. Such resilience may be achieved by way of material properties of the second chain retention feature, or a structure thereof. For example, the second chain retention feature may be a deformable wing—capable of being inserted through the first chain retention feature and expanding to resist extraction in the same direction. It is envisaged that in example embodiments this deformation may be achieved by way of mechanical properties of the material used for the feature, but it should be appreciated that alternative embodiments are also envisaged—for example one or more wings pivoting about a pin.

In an example embodiment the drive sprocket of the chain driver may include gullets configured to accommodate the second chain retention feature. For example, where the second chain retention feature is opposing studs, the gullets of the drive sprocket may include a recess configured to receive the studs.

In example embodiments in which the first chain retention feature is a recess such as a T-slot, the guide bar may include at least one expanded opening into the first chain retention feature permitting passage of the second chain retention feature. In example embodiments the guide bar may include a plurality of expanded openings into the first chain retention feature. When installing the chain, the second chain retention features may be fed through the at least one expanded opening into the first chain retention feature.

In an example embodiment the at least one expanded opening into the first chain retention feature may be angled in the intended direction of chain travel, from the outer edge of the guide bar inwardly. It is envisaged that this may discourage the second chain retention features from exiting the first chain retention feature via the expanded openings during operation.

In an example embodiment the guide bar may include a first body member and a second body member configured to be secured to each other to collectively form the first chain retention features. For example, where the first chain retention feature is a recess such as a T-slot, the body members may include grooves forming part of the T-slot. Where expanded openings into the first chain retention features are provided, the body members may include a plurality of crenellations along the outer edges of the grooves.

In an example embodiment the guide bar may include at least one removable rail member forming part of the first retention feature when secured to a main body of the guide bar. For example, where the first chain retention feature is a recess such as a T-slot, the removable rail member may include a groove forming part of the T-slot. The rail member may be secured to the main body of the guide bar using any suitable means, for example a plurality of fasteners such as screws. In an example embodiment the at least one rail member may be pivotally attached to the main body of the guide bar. In doing so, the rail member may remain attached to the main body during installation or removal of the chain.

According to an example embodiment of the present disclosure there is provided a saw apparatus including a guide bar, a chain driver, and an endless cutting chain trained about the guide bar and the chain driver. The saw apparatus may include a magnetic field generator configured to be selectively activated to provide a magnetic field within the vicinity of at least a portion of the endless cutting chain when trained about the guide bar and the chain driver.

It is envisaged that on activation of the magnetic field generator, at least a portion of the endless cutting chain may be attracted to the guide bar to clamp it thereto, or at least provide sufficient deceleration of the chain to reduce the likelihood of a chain shot event.

According to an example embodiment of the present disclosure there is provided a guide bar for a saw apparatus, the guide bar including a magnetic field generator configured to be selectively activated to provide a magnetic field within the vicinity of at least a portion of an endless cutting chain when trained about the guide bar.

In an example embodiment the electric field generator may include at least one electromagnet. The electric field generator may be configured such that the magnetic field acts directly on the endless cutting chain, or by magnetizing an intermediary component such as the guide bar.

In an example embodiment the saw apparatus may include at least one sensor configured to output a signal indicative of a break, or likelihood of a break, in the endless cutting chain. For example, the sensor may be a tension sensor (with a loss in tension potentially indicative of a break in the chain), or a motor speed sensor (with a sudden acceleration of the motor potentially indicative of a break in the chain).

In an example embodiment the saw apparatus may include a controller configured to control the activation of the magnetic field generator on receiving the signal from the at least one sensor.

In an example embodiment the endless chain may include magnetic components—whether one or more of the links are made of magnetic material, or include magnetic features such as a press-fit magnet in the tang of a drive link. In an example embodiment, the polarity of the magnetic field of the magnetic field generator may be a first polarity during normal cutting operation in order to reduce the friction between the cutting chain and the bar, and reversed in the event of a hazardous incident.

According to an example embodiment of the present disclosure there is provided a saw apparatus including a guide bar, a chain driver, and an endless cutting chain trained about the guide bar and the chain driver. The saw apparatus may include a clamping member configured to be selectively actuated to provide a clamping force against at least a portion of the endless cutting chain when trained about the guide bar and the chain driver.

It is envisaged that on activation of the clamping member, at least a portion of the endless cutting chain may be prevented from movement away from the guide bar, or at least provide sufficient deceleration of the chain to reduce the likelihood of a chain shot event.

According to an example embodiment of the present disclosure there is provided a guide bar for a saw apparatus, the guide bar including a clamping member configured to be selectively actuated to provide a clamping force against at least a portion of the endless cutting chain when trained about the guide bar.

In an example embodiment the clamping member may extend continuously along at least a portion of the guide bar by a distance greater than at least one of the links of the endless cutting chain. In an example embodiment the clamping member may include a plurality of discrete clamping points spaced apart along the rail of the guide bar.

In an example embodiment the clamping member may be actuated by releasing a biasing member—for example triggering release of at least one spring. In an example embodiment the clamping member may be actuated by an actuator, for example one which is electrically, hydraulically, or pneumatically powered.

In an example embodiment the saw apparatus may include at least one sensor configured to output a signal indicative of a break, or likelihood of a break, in the endless cutting chain. For example, the sensor may be a tension sensor (with a loss in tension potentially indicative of a break in the chain), or a motor speed sensor (with a sudden acceleration of the motor potentially indicative of a break in the chain).

In an example embodiment the saw apparatus may include a controller configured to control the activation of the clamping member on receiving the signal from the at least one sensor.

In an example embodiment the saw apparatus may include a tip guard over the tip of the guide bar, acting as a barrier to a broken chain whipping from the tip of the bar and therefore reducing the likelihood of chain shot occurring. It is envisaged that such a tip guard may provide a housing around at least a portion of the tip of the guide bar. In such an embodiment it is contemplated that the chain retention features may be not be utilized—although it should be appreciated that this is not intended to be limiting to all embodiments. It is envisaged that the length of the saw bar may need to be extended in comparison with embodiments in which the tip guard is not provided, in order to achieve a comparable cutting capacity of the saw in terms of diameter of trees which may be processed.

The above and other features will become apparent from the following description and the attached drawings.

BRIEF DESCRIPTION OF THE DRAWINGS

The detailed description of the drawings refers to the accompanying figures in which.

DETAILED DESCRIPTION

Figure 1A:
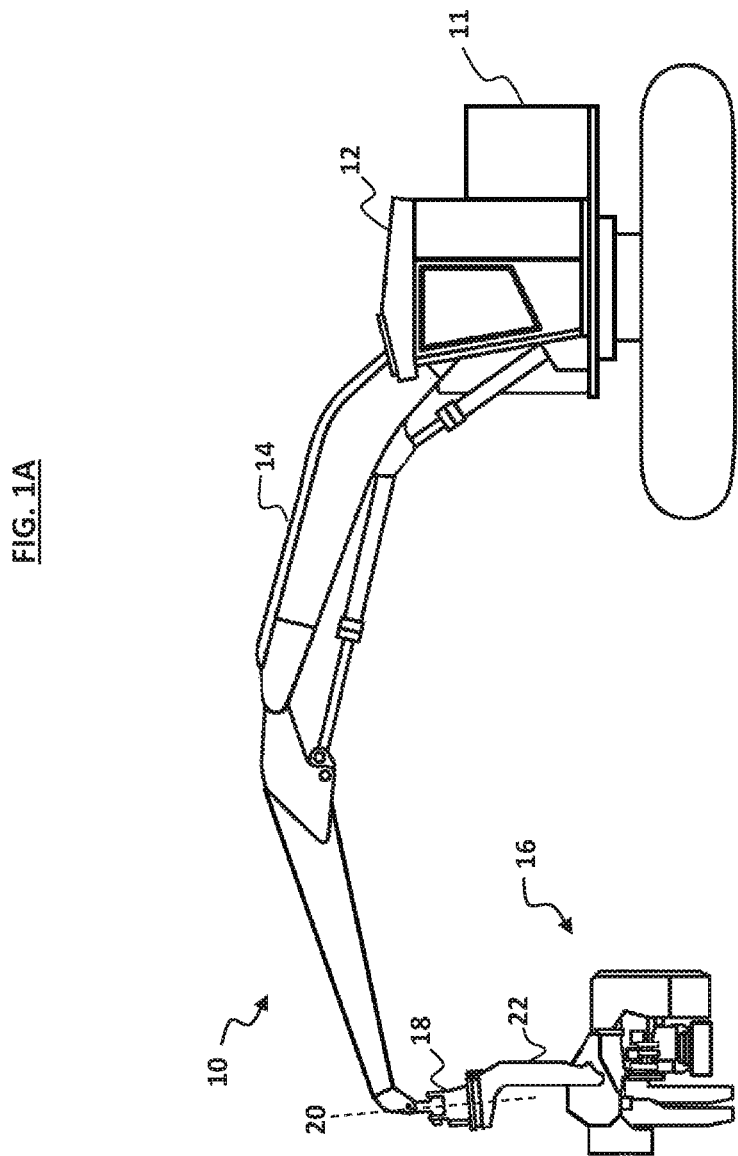
FIG. 1A is a side view of an example timber-working system including an example forestry head.

FIG. 1A illustrates a timber-working system including a carrier 10 for use in forest harvesting. The carrier 10 includes a base machine 11, having an operator cab 12 from which an operator (not shown) controls the carrier 10. The carrier 10 further includes a boom assembly 14 connected to the base machine 11, to which a timber-working device in the form of a forestry head 16 is connected.

Connection of the head 16 to the boom assembly 14 includes a rotator 18, configured to rotate the head 16 about the generally vertical axis of rotation marked by dashed line 20. A tilt bracket 22 further allows rotation of the head 16 between a prone position (as illustrated) and a standing position.

Figure 1B:
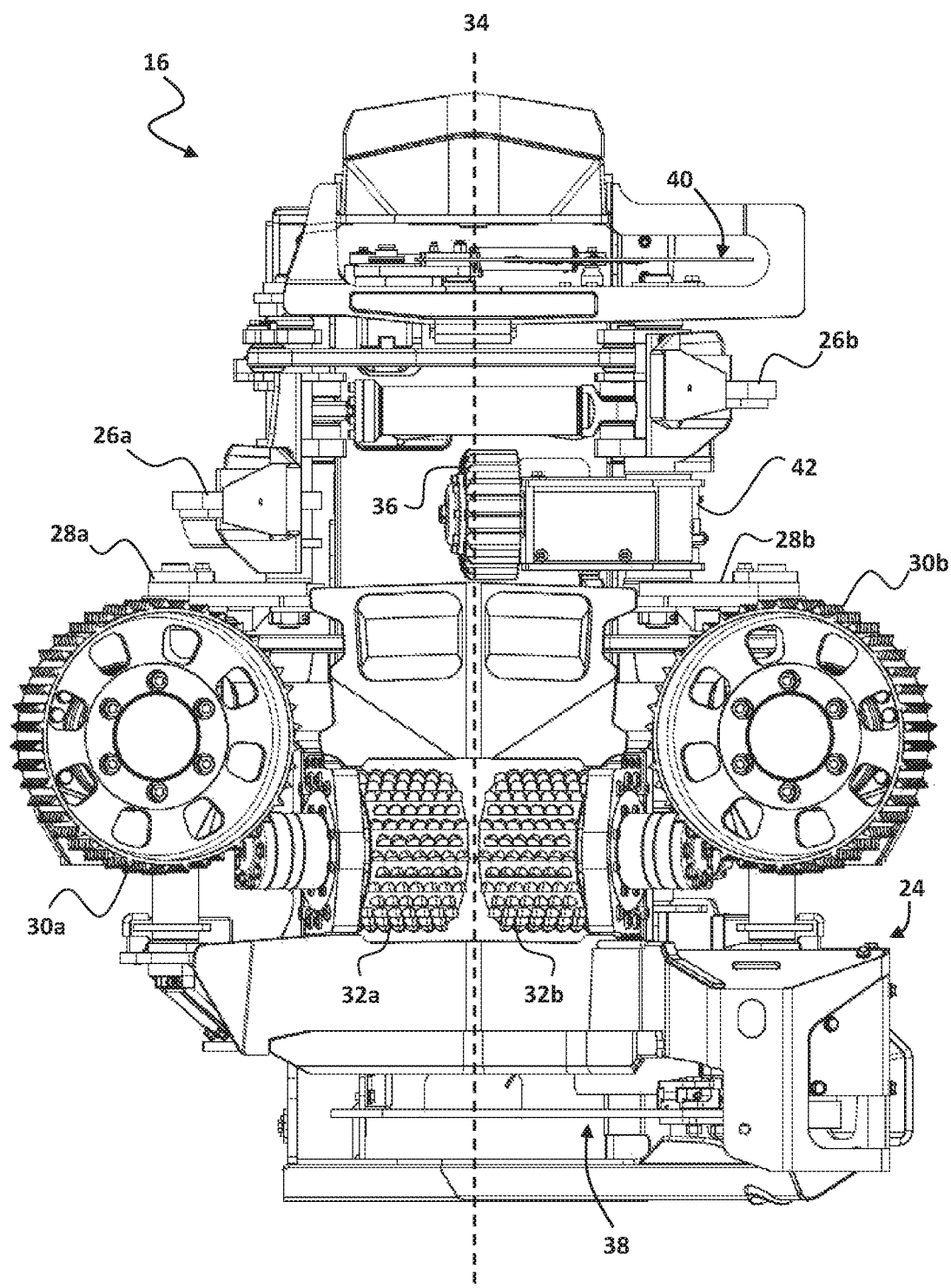
FIG. 1B is an elevated view of the example forestry head.

Referring to FIG. 1B, the head 16 includes a frame 24 to which the tilt bracket 22 of FIG. 1 is pivotally attached. Right hand (RH) and left hand (LH) delimb arms 26a and 26b are pivotally attached to the frame 24, as are opposing RH and LH feed arms 28a and 28b. RH and LH feed wheels 30a and 30b are attached to RH and LH feed arms 28a and 28b respectively, which together with RH and LH frame-mounted feed wheels 32a and 32b may be controlled to feed one or more stems (not illustrated) along a longitudinal feed axis 34 of the head 16. It should be appreciated that while the head 16 is illustrated as having two frame-mounted feed wheels, in example embodiments the head may have one frame-mounted feed wheel, or none, as known in the art. Feed wheels 30a, 30b, 32a and 32b may collectively be referred to as the 'feed mechanism.' It should be appreciated that reference to the feed wheels is intended to include the hydraulic rotary drives propelling them. A measuring wheel 36 may be used to measure the length of the stem as it passes.

A main chainsaw 38, and a topping chainsaw 40, are attached to the frame 24. The main saw 38 is typically used to fell a tree when the head 16 is in a harvesting position, and to buck stems into logs in the processing position of the head 16 (as seen in FIG. 1A). The topping saw 40 may be used to cut off a small-diameter top portion of the stem(s) to maximize the value recovery of the trees.

Figure 2:
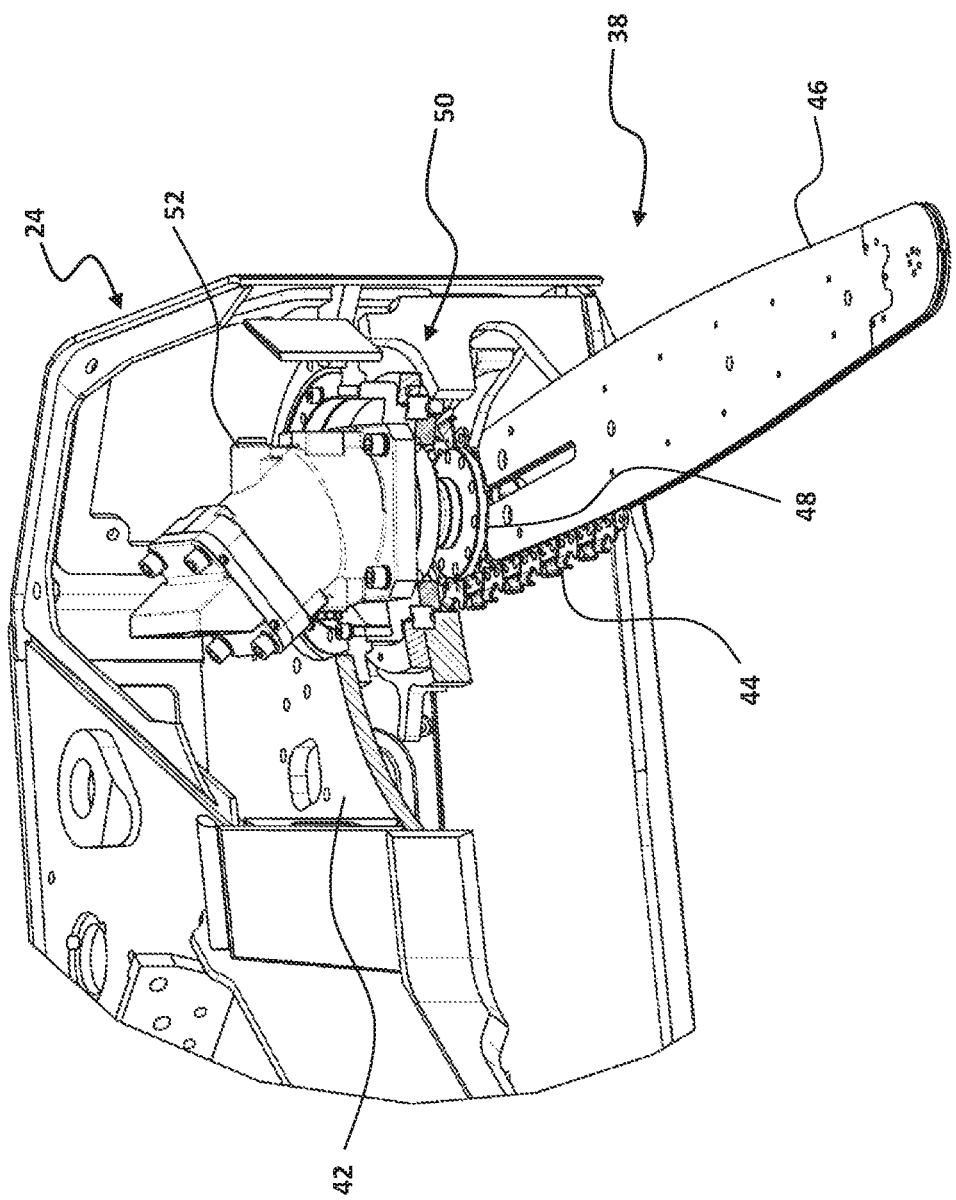
FIG. 2 is a perspective view, with portions broken away, showing a chain saw of the forestry head.

Referring to FIG. 2, the saw 38 is mounted to a saw housing 42 of the frame 24. The saw 20 includes an endless cutting chain 44, a guide bar 46, and a chain driver in the form of a drive sprocket 48.

An attachment device 50 attaches the chain 34, the guide bar 46, and the drive sprocket 48 to the saw housing 32, while permitting pivoting of the guide bar 46 between a stowage position retracted into the saw housing 42 and a deployed position during a sawing event (e.g., felling, bucking). In example embodiments the attachment device may be as described in PCT Application No. PCT/NZ2014/000197, the contents of which is incorporated herein by reference in its entirety.

The drive sprocket 48 is attached to an output shaft of a drive device in the form of a hydraulic motor 52, for controlled rotation of the sprocket 48. The chain 44 is trained about the sprocket 48, rotation of which drives the chain 44 around the guide bar 46. While not clearly seen in FIG. 2, the guide bar 46 includes grooves along its sides and nose—herein referred to as the rails of the guide bar—which guide the chain 44.

Figure 3:
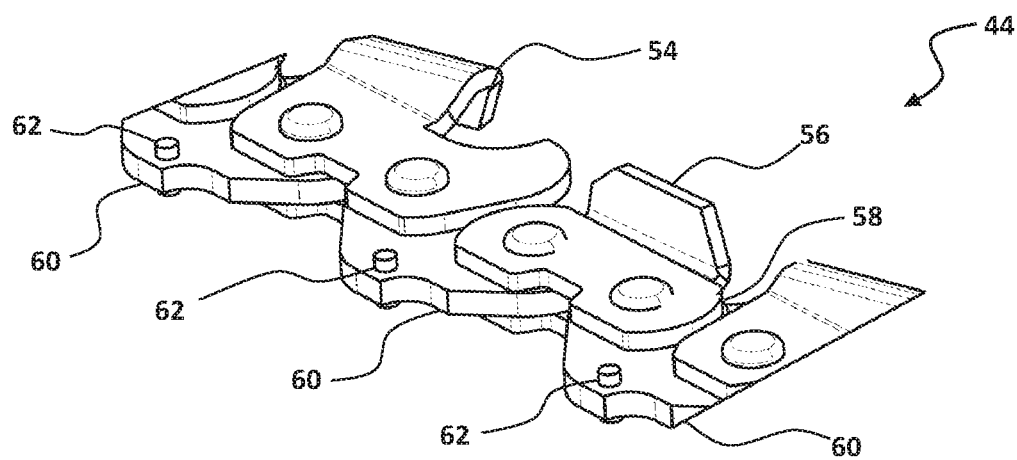
FIG. 3 is a perspective view of a portion of an endless chain of the saw.

Referring to FIG. 3, an example endless chain 44 includes right hand cutters 54, left hand cutters 56, tie straps 58, and drive links 60. In the example embodiment illustrated, the drive links 60 include laterally projecting studs 62.

Figure 4:
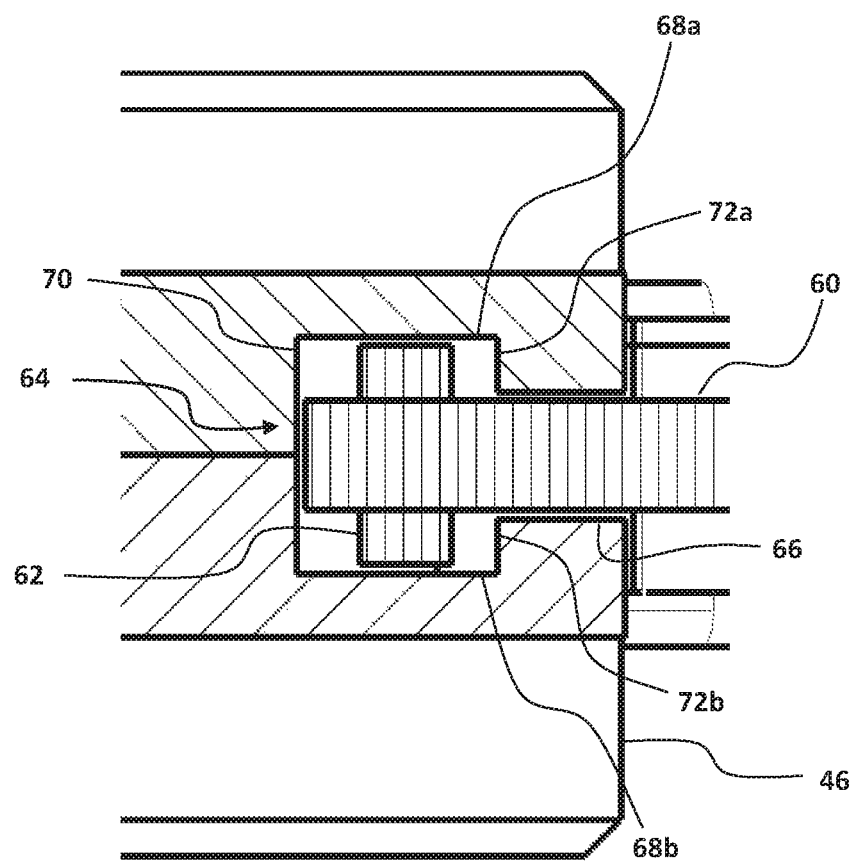
FIG. 4 is a cross sectional view of a portion of the saw.

In FIG. 4, it may be seen that the rail 64 in the guide bar 46 is configured as a 'T' slot, having an entrance slot 66 in the side of the guide bar 46 opening into a first internal groove 68a and second internal groove 68b. The drive links 60 extend through the entrance slot 66, with the studs 62 received within the grooves 68a and 68b. The studs 62 are offset from the innermost surface 70 of the rail 64, as well as groove walls 72a and 72b of the grooves 68a and 68b.

In normal operation, the chain 44 is tensioned to draw it onto the guide bar 46, and the studs 62 do not come in contact with the groove walls 72a and 72b as the chain is driven. However, in the event of a break in the chain 44 occurring, the studs 62 in combination with groove walls 72a and 72b prevent the exit of the associated drive link 60 from the rail 64. Chain shot typically requires an extended length of chain to go through a whipping motion before it can occur. By preventing such an extended length of chain 44 from being released from the guide bar 46, the likelihood of chain shot may be reduced.

Figure 5:
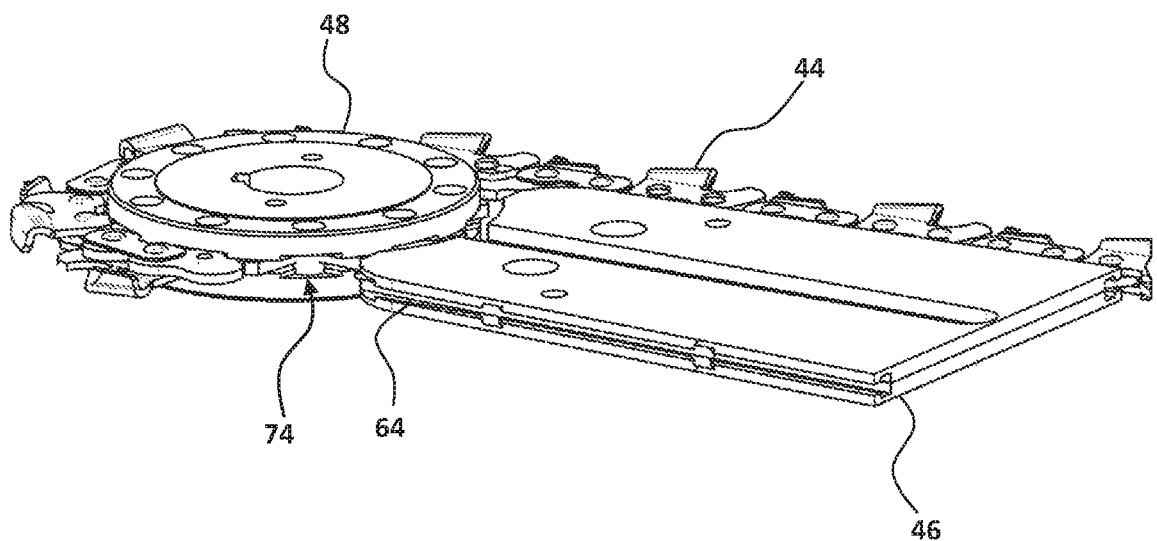
FIG. 5 is a perspective view showing a drive sprocket of the saw.

In FIG. 5, it may be seen that the drive sprocket 48 includes gulleys 74 which are expanded in the direction of the rotational axis, i.e. between the faces of the drive sprocket 48. This accommodates and locates the studs of the drive links of the chain 44, assisting with guiding them back into the rail 64 of the guide bar 46.

Figure 6A:
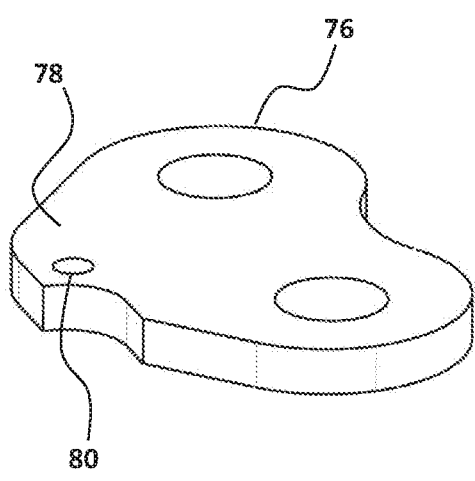
FIGS. 6A and 6B are perspective views showing stages of manufacture of a link for the endless chain.
Figure 6B:
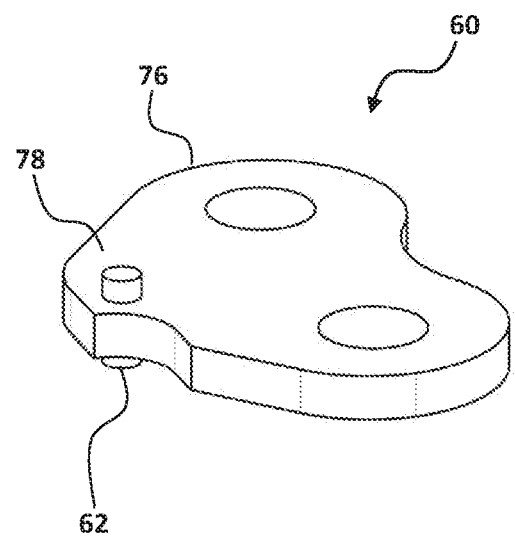

FIG. 6A and FIG. 6B illustrate an example method of manufacturing the studded drive link 60. A base drive link 76 has a tang 78, in which a pin aperture 80 is located. Referring to FIG. 6B, a pin 62 is press fit into the pin aperture 80 to produce the studded drive link 60.

Figure 7A:
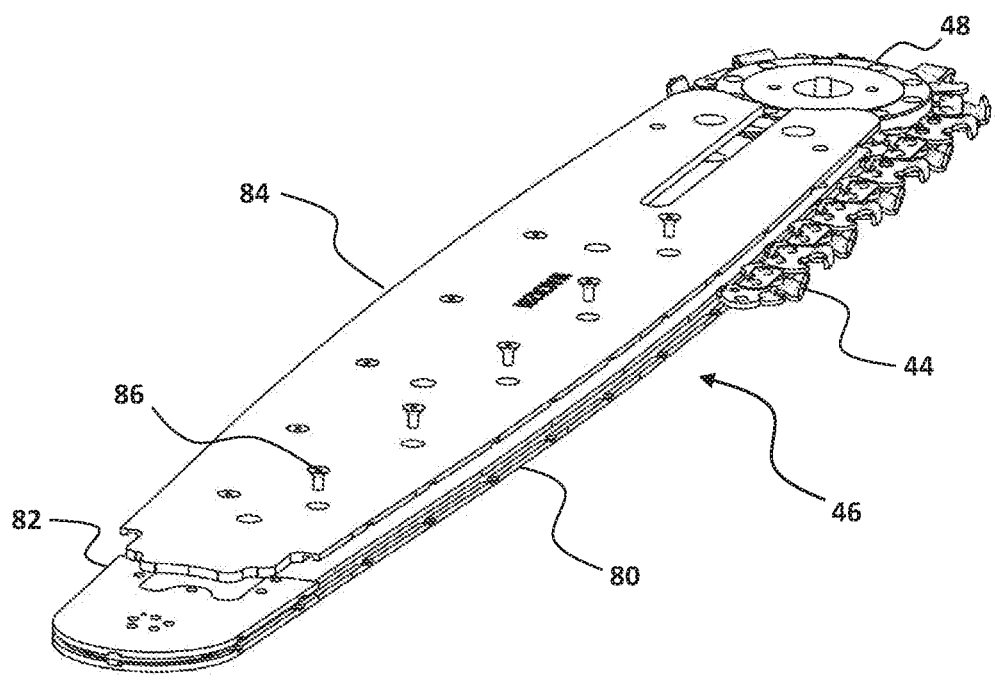
FIGS. 7A and 7B are perspective views of an exploded example guide bar for the saw.
Figure 7B:
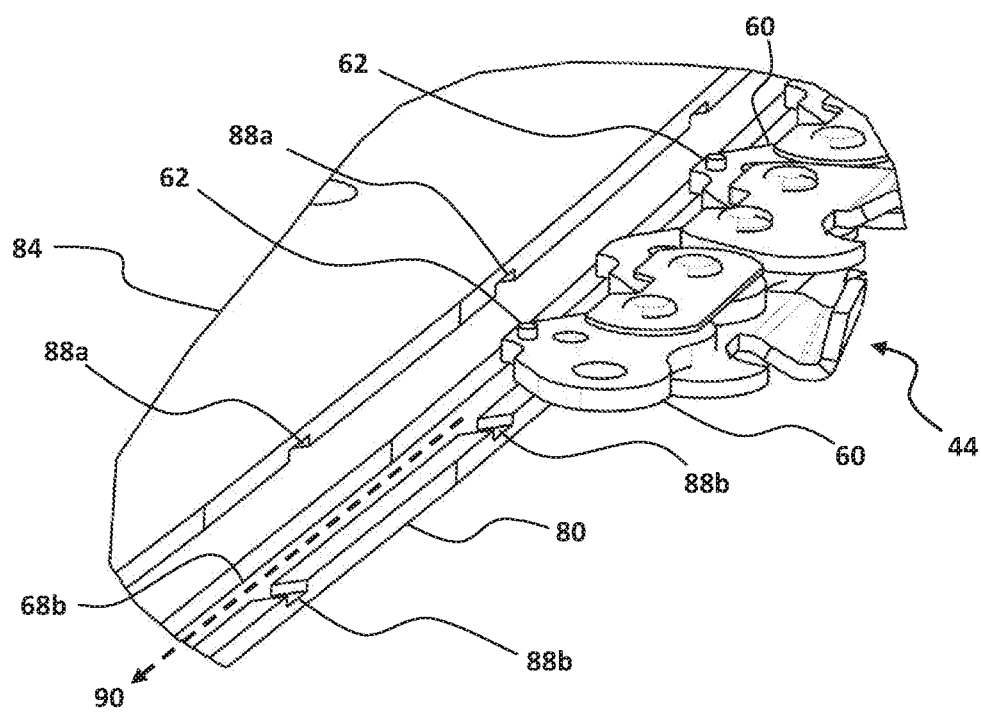

FIG. 7A and FIG. 7B provide further details of an example embodiment of the guide bar 46. In this embodiment the guide bar 46 includes a base body member 80 and a nose 82. A second body member 84 is configured to be fastened to the base body member 80 using threaded fasteners 86 (although it should be appreciated that alternative fastening means may be used, for example rivets), to collectively produce the rails 64. Referring to FIG. 7B, the base body member 80 includes the second groove 68b, while the second body member 84 includes the first groove 68a (not shown in FIG. 7B—but see FIG. 4).

To facilitate the installation or replacement of the chain 44, a series of crenellations are formed by notches 88a and 88b extending into the grooves 68a and 68b. When the second body member 84 is fastened to the base body member 80, the notches 88a and 88b form openings into the T-slot of the rail 64. This allows the studs 62 of the studded drive links 60 to be fed through the openings such that the studs 62 may be located within the rail 64 and retained by groove walls 72a and 72b.

In order to reduce the likelihood of the drive links 60 unintentionally exiting via the notches 88a and 88b, and assist with allowing with a forward motion while feeding the drive links 60 into the rail 64, the notches 88a and 88b may be angled in the intended direction of chain travel.

FIG. 7B also illustrates an example embodiment of the chain 44 in which the studded drive links 60 alternate with standard drive links along the length of the chain 44.

Figure 8A:
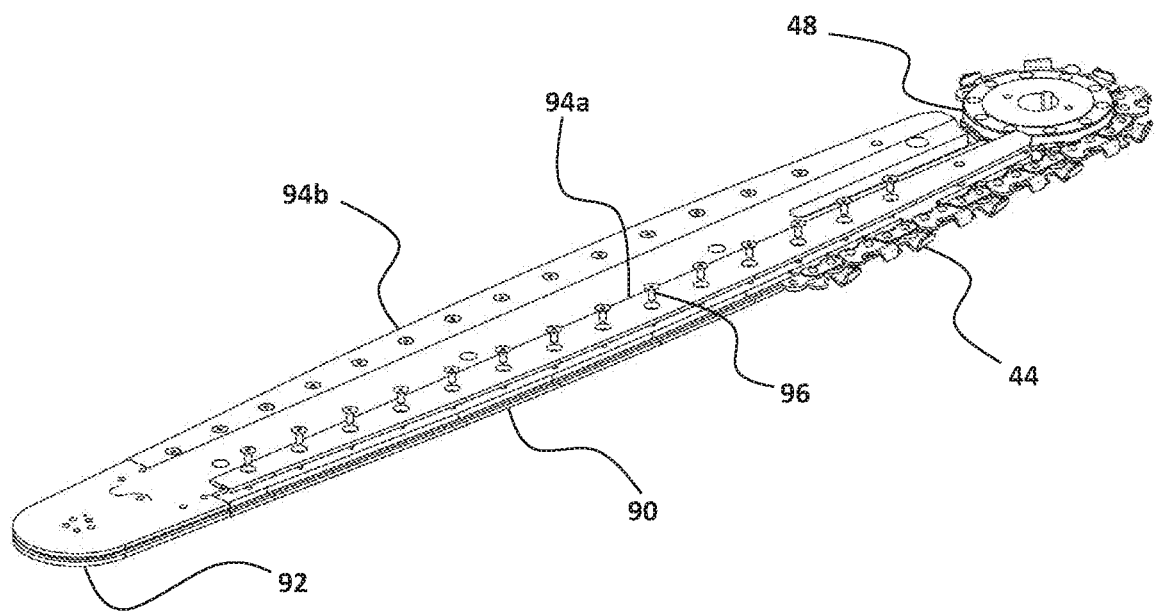
FIGS. 8A and 8B are perspective views of another exploded example guide bar for the saw.
Figure 8B:
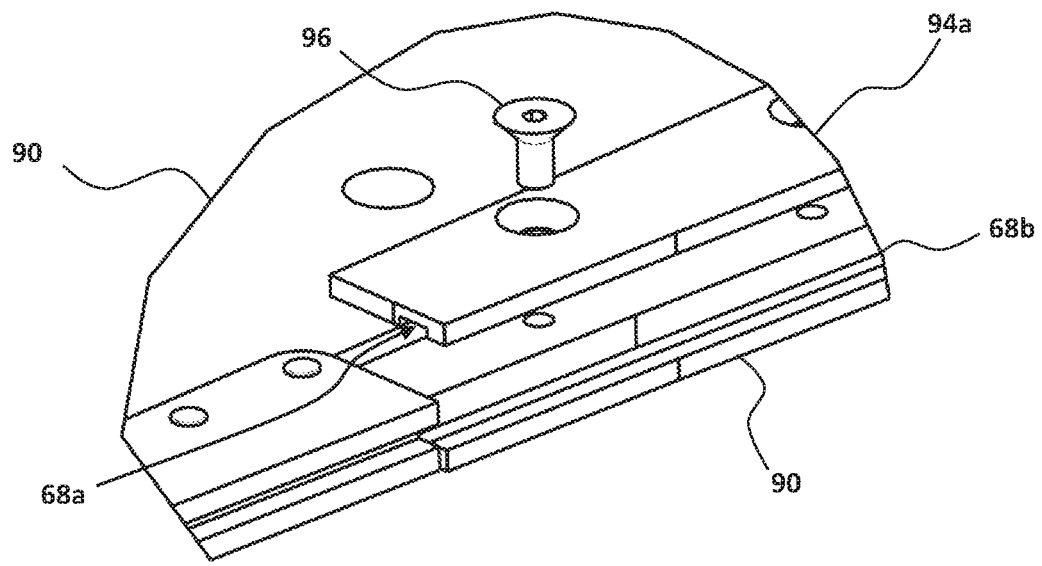

FIG. 8A and FIG. 8B provide further details of a further example embodiment of the guide bar 46. In this embodiment the guide bar 46 includes a base body member 90 and a nose 92. First and second removable rail members 94a and 94b are configured to be fastened to the base body member 90 using threaded fasteners 96, to collectively produce the rails 64. Referring to FIG. 8B, the base body member 90 includes the second groove 68b, while the removable rail member 94a includes the first groove 68a.

It is envisaged that for installation, a length of the chain 44 may be located in the second groove 68b of the base body member 90, before fastening the removable rail member 94a in place. In an alternative embodiment, the rail members 94a and 94b may be provided with notches as described with reference to FIG. 7A and FIG. 7B. In such an embodiment, it is envisaged that more permanent forms of fastener may be used to secure the rail member 94a in place—for example, rivets.

Figure 9:
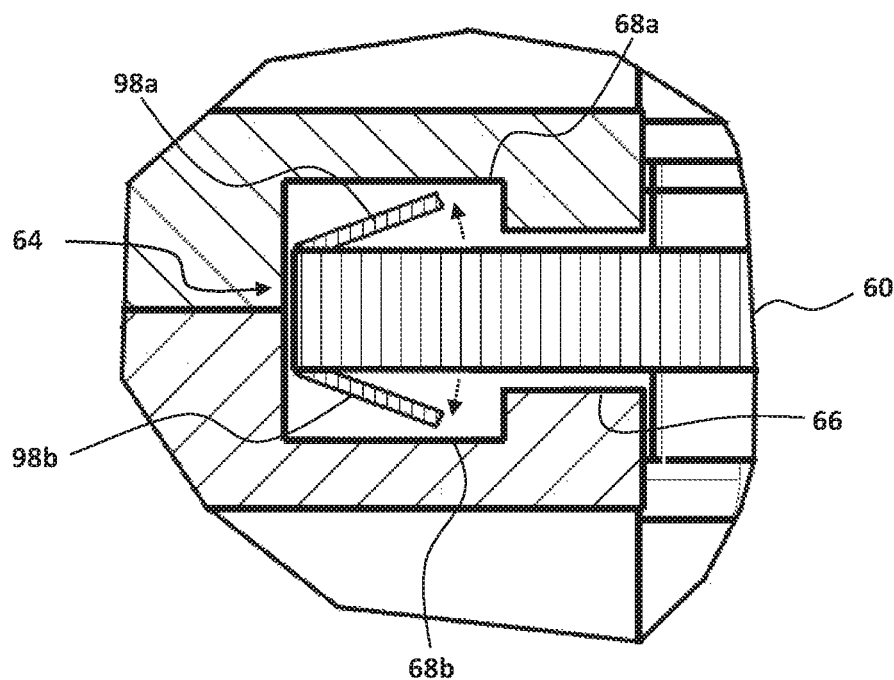
FIG. 9 is a cross sectional view of another example embodiment of a chain retention configuration for the saw.

FIG. 9 shows an alternative example chain retention feature to that described with reference to FIG. 4. In FIG. 9, the drive link 60 includes resilient wings 98a and 98b on either side of the tang of the link 60. During installation, the drive link 60 may be pushed through the entrance slot 66 of the rail 64 in the guide bar 46, with the wings 98a and 98b forced against the link 60. On entering the first internal groove 68a and second internal groove 68b respectively, the wings 98a and 98b may extend, to resist extraction back through the entrance slot 66—for example in the event of a break in the endless chain.

Figure 10:
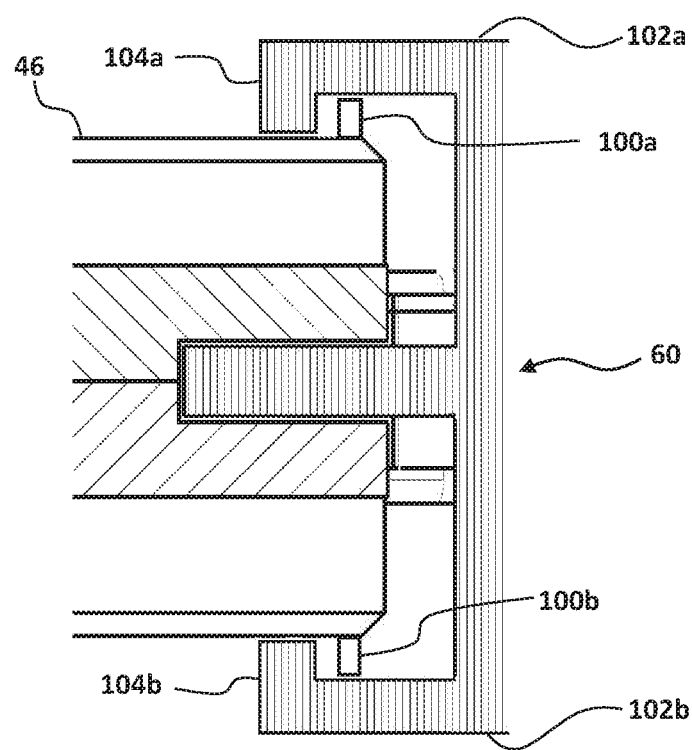
FIG. 10 is a cross sectional view of a further example embodiment of a chain retention configuration for the saw.

FIG. 10 shows a further alternative example chain retention feature. In FIG. 10, external first and second ridges 100a and 100b are provided on the faces of the guide bar 46. One of the links of the endless chain, for example drive link 60, includes a first retention arm 102a having a first catch 104a extending toward the guide bar 46 on the other side of the first ridge 100a. A clearance is provided between the catch 104a and the ridge 100a when the chain is tensioned, to reduce wear therebetween. In the example embodiment illustrated, the drive link 60 also includes a second retention arm 102b having a second catch 104b extending toward the guide bar 46 on the other side of the second ridge 100b. In the event of a break in the endless chain, movement of the catches 104a and 104b (and therefore the endless chain) away from the guide bar 46 is prevented by the external ridges 100a and 100b. It should be appreciated that in example embodiments the ridges 100a and 100b may be replaced by grooves in the guide bar 46, into which the catches 104a and 104b project. In an example embodiment, at least one of the first retention arm 102a and second retention arm 102b may be resiliently movable outwardly to assist with positioning the drive link 60 on the guide bar 46, springing back into place once released to retain the drive link 60 relative to the guide bar 46.

Figure 11:
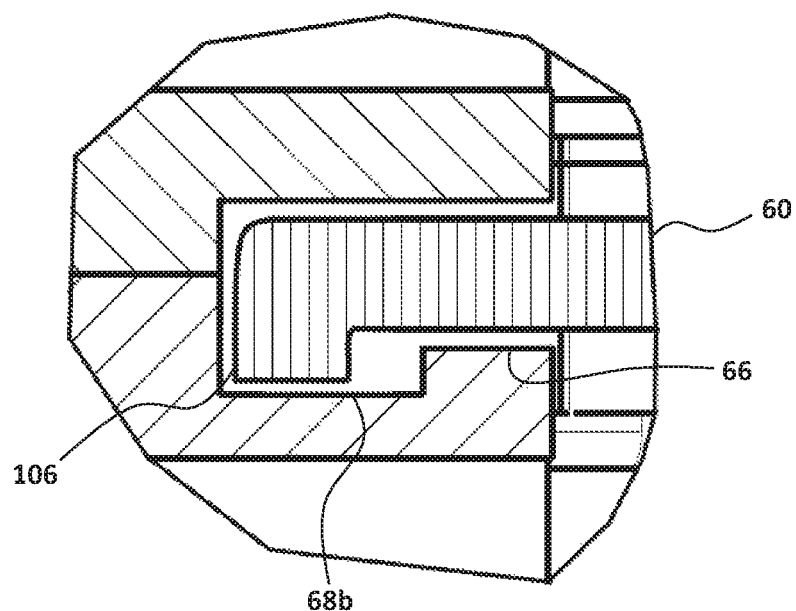
FIG. 11 is a cross sectional view of another example embodiment of a chain retention configuration for the saw.

FIG. 11 shows an alternative example chain retention feature to that described with reference to FIG. 4. In FIG. 11, the end of the tang of the drive link 60 is bent to produce a flange 106 which resists extraction through the entrance slot 66.

Figure 12:
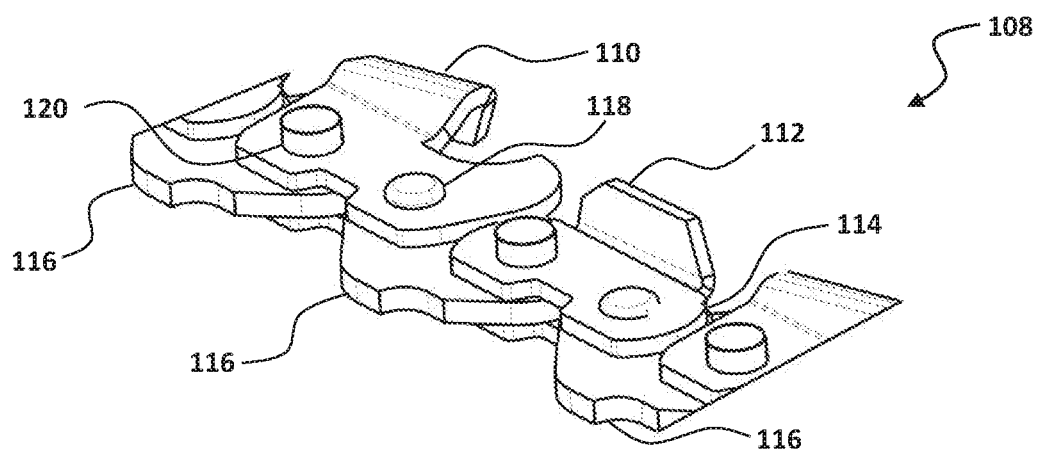
FIG. 12 is a perspective view of a portion of an endless chain of the saw.

FIG. 12 shows an alternative chain configuration for providing a chain retention feature, with an example endless chain 108 includes right hand cutters 110, left hand cutters 56, tie straps 58, and drive links 60. In the example embodiment illustrated, the chain rivets used to secure the components may alternate between standard rivets 118 and extended rivets 120 (although it should be appreciated that alternative patterns are contemplated—including eliminating all standard rivets 118). The extended rivets 120 may be implemented in a similar manner to the configuration illustrated in FIG. 4. It is envisaged that the height of the cutters 110 and 112 may be extended in order to achieve a desired separation of the cutting elements from the guide bar, if required.

Figure 13:
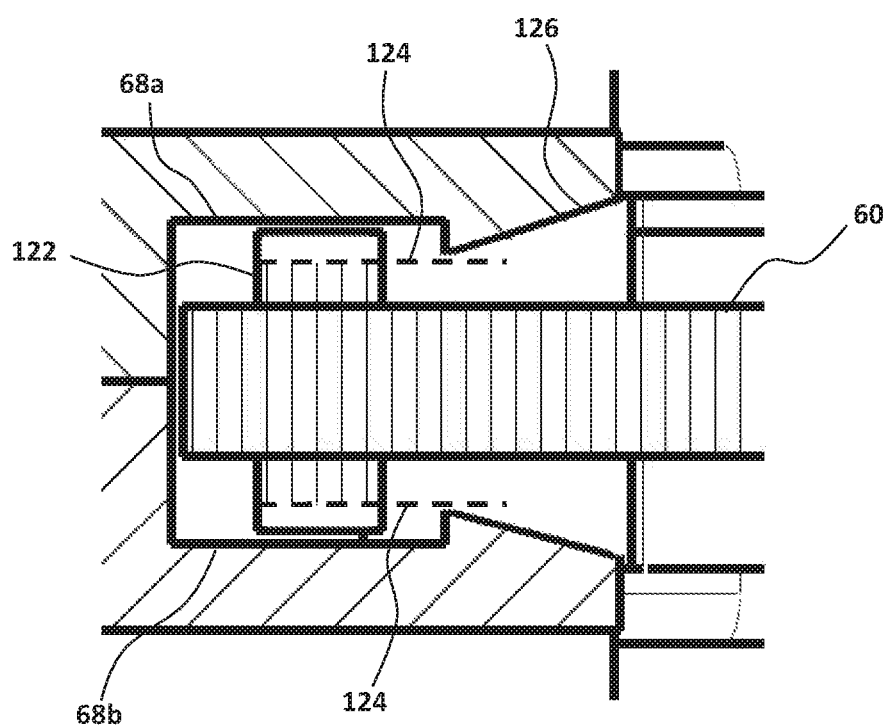
FIG. 13 is a cross sectional view of another example embodiment of a chain retention configuration for the saw.

FIG. 13 shows an alternative example chain retention feature to that described with reference to FIG. 4. In FIG. 13 the drive links 60 are provided with a spring bar 122 in place of the studs 62 of FIG. 4. The ends of the spring bar 122 may be compressed from the extended position illustrated to a reduced length 124. The entrance slot 126 of the configuration funnels inwardly to the first internal groove 68a and second internal groove 68b. During installation, the drive links 60 are pushed through the entrance slot 126, with the spring bar 122 being compressed until reaching the internal grooves 68a and 68b, where it extends outwardly.

Figure 14:
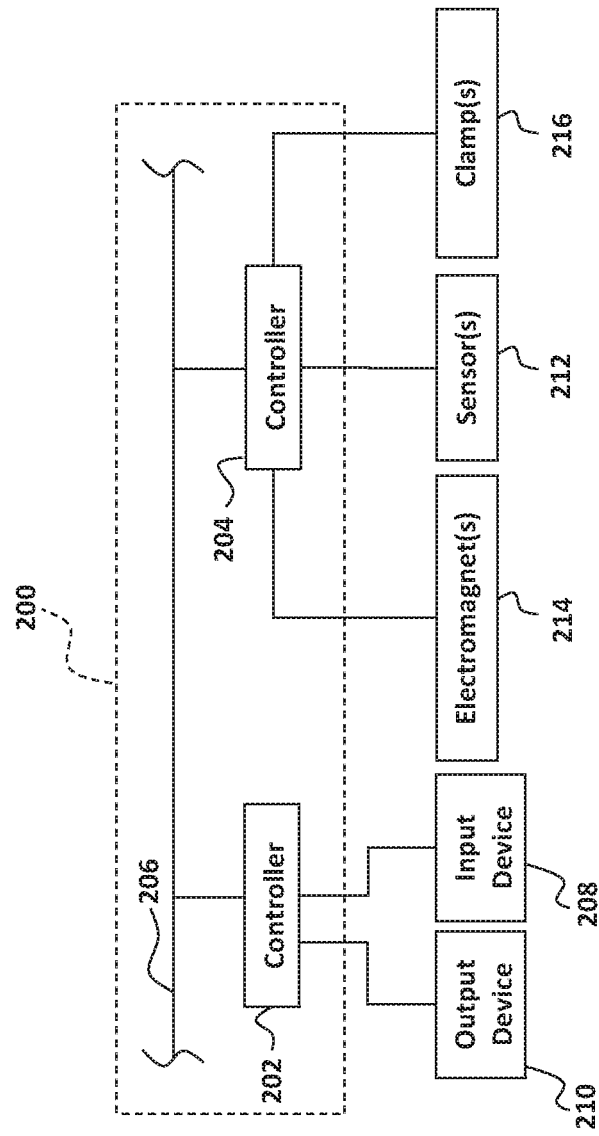
FIG. 14 is a diagrammatic view showing a control system of the saw apparatus.

Referring to FIG. 14, the system includes an electronic control system 200. The control system 200 includes one or more electronic controllers, each controller including a processor and memory having stored therein instructions which, when executed by the processor, causes the processor to perform the various operations of the controller. For example, the control system 200 includes a first controller 202 on board the head 16 and a second controller 204 on board the carrier 10. The controllers 202, 204 are connected to one another via a communications bus 206 (e.g., a CAN bus, or a wireless link). A human operator operates an operator input device 208, for example hand and foot controls, located at the operator's cab 12 of the carrier 10 to control the head 16. Details of operation are output to an output device 210—for example a monitor. Certain automated functions may be controlled by first controller 202 and/or second controller 204.

The head 16 may have a number of sensors 212 electrically coupled to the second controller 204—for example a tension sensor configured to output an indication of the current tension on the endless cutting chain, or a motor speed sensor configured to output an indication of the current speed of the hydraulic motor of the saw apparatus. The control system 200 may be configured to monitor the output of these sensors 212 and determine whether a chain break has occurred, or is predicted as having a high likelihood of occurring.

In an example embodiment the saw 38 may include an electromagnetic field generator, such as one or more electromagnets 214. On determination of a chain break, the control system may be configured to activate the electromagnets 214 to attract the endless cutting chain to the guide bar of the saw 38.

In an example embodiment the saw 38 may include at least one clamping member 216 capable of being actuated from a first position away from the endless cutting chain to a second position in which it contacts the endless cutting chain. On determination of a chain break, the control system may be configured to activate the clamping member to restrict movement of the endless cutting chain relative to the guide bar of the saw 38.

Figure 15:
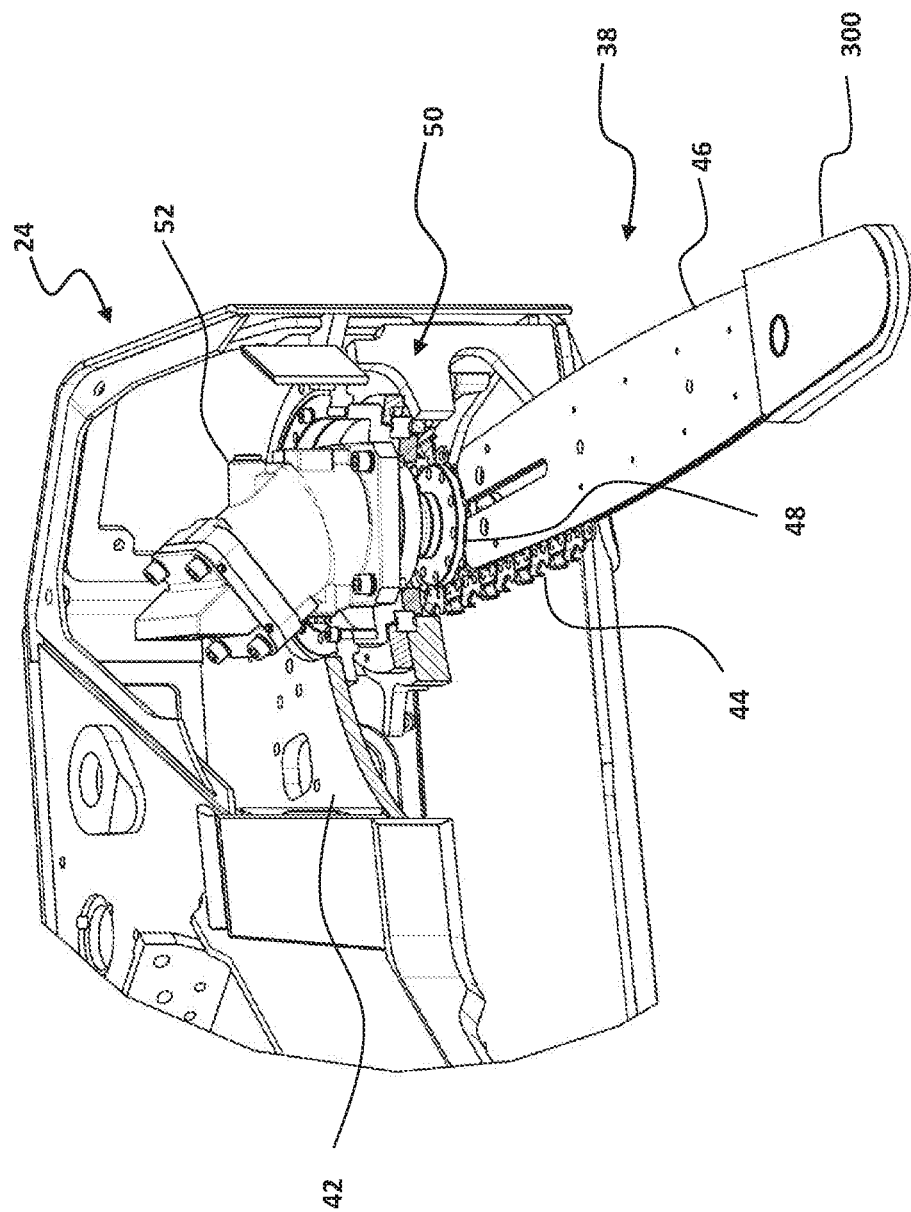
FIG. 15 is a perspective view of an example guide bar fitted with an example tip guard.

Referring to FIG. 15, the saw 38 may be provided with a tip guard 300 over the tip of the guide bar 46 distal from the drive sprocket 48. In the example embodiment illustrated the tip guard 300 includes a housing configured as a clamshell to enclose the tip of the guide bar 46 when installed. In the event of a breakage in the chain 44, the broken end is prevented from whipping outwardly from the tip, thereby reducing the likelihood of chain shot being produced.

The welds, threads, and hydraulic and electrical lines of the forestry head have not been shown for simplification of illustration, it being understood that it would be well within the skill of one of ordinary skill in the art to provide those features without undue experimentation.

No admission is made that any reference disclosed herein constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the field of endeavour, in New Zealand or in any other country.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

Embodiments described herein may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the scope of the disclosure and without diminishing its attendant advantages. It is therefore intended that such changes and modifications be included within the present invention.

Embodiments have been described by way of example only and it should be appreciated that modifications and additions may be made thereto without departing from the scope thereof.

The invention claimed is:

1. A saw apparatus, comprising:
a guide bar;
a chain driver; and
an endless cutting chain trained about the guide bar and the chain driver, the endless chain including a plurality of cutter links, drive links, and tie straps,
wherein the guide bar comprises a first chain retention feature along at least a portion of a periphery of the guide bar, wherein the first chain retention feature comprises a main recess extending inwardly from an outer edge of the guide bar, and at least one secondary internal recess transverse to the main recess; and
wherein the cutting chain comprises a second chain retention feature configured to interact with the first chain retention feature such that movement of the second chain retention feature away from the guide bar is restricted, wherein the second chain retention feature comprises a main protrusion having at least one secondary protrusion transverse to the main protrusion, the at least one secondary protrusion received by the at least one secondary internal recess; and
wherein the guide bar comprises at least one expanded opening on the outer edge of the guide bar, wherein the at least one expanded opening intersects the at least one secondary internal recess, wherein the at least one expanded opening is in a form of a notch in at least one wall of the main recess, and the at least one expanded opening is configured to permit passage of the at least one secondary protrusion from the outer edge of the guide bar into the at least one secondary internal recess.

2. The saw apparatus of claim 1, wherein the second chain retention feature comprises the protrusion, and the at least one secondary protrusion comprises a pin, the pin press fit into an aperture of a link of the endless chain to provide opposing studs on either side of the link.

3. The saw apparatus of claim 1, wherein the secondary protrusion is offset from at least surfaces of the secondary recess facing either towards and/or away from the periphery of the guide bar.

4. The saw apparatus of claim 1, wherein the expanded opening is angled in an intended direction of cutting chain travel, from the outer edge of the guide bar inwardly.

5. The saw apparatus of claim 1, wherein the guide bar comprises a first body member and a second body member configured to be secured relative to each other to form the first chain retention feature.

6. The saw apparatus of claim 1, wherein the guide bar comprises a main body, and at least one removable rail member forming part of the first retention feature when secured to the main body of the guide bar.

7. The saw apparatus of claim 1, wherein the at least one secondary protrusion comprises a first secondary protrusion extending from a first side of the main protrusion, and a second secondary protrusion extending from a second side of the main protrusion.

8. The saw apparatus of claim 1, wherein the first chain retention feature does not extend along a nose of the guide bar.

9. The saw apparatus of claim 1, wherein the second chain retention feature is movable relative to a link of the endless cutting chain on which the second chain retention feature is provided.

10. The saw apparatus of claim 1, wherein the chain drive comprises a drive sprocket, and the drive sprocket comprises gullets configured to accommodate the second chain retention feature.

11. The saw apparatus of claim 1, further comprising a tip guard positioned over a nose of the guide bar.

12. A timber-working device, comprising:
a frame,
at least one pair of arms pivotally attached to the frame and configured to be controlled to grasp at least one tree, and
a saw apparatus mounted to the frame, wherein the saw apparatus comprises:
a guide bar;
a chain driver; and
an endless cutting chain trained about the guide bar and the chain driver, the endless chain including a plurality of cutter links, drive links, and tie straps, wherein the guide bar comprises a first chain retention feature along at least a portion of a periphery of the guide bar, wherein the first chain retention feature comprises a main recess extending inwardly from an outer edge of the guide bar, and at least one secondary internal recess transverse to the main recess; and wherein the cutting chain comprises a second chain retention feature configured to interact with the first chain retention feature such that movement of the second chain retention feature away from the guide bar is restricted, wherein the second chain retention feature comprises a main protrusion having at least one secondary protrusion transverse to the main protrusion, the at least one secondary protrusion received by the at least one secondary internal recess; and wherein the guide bar comprises at least one expanded opening on the outer edge of the guide bar, wherein the at least one expanded opening intersects the at least one secondary internal recess, wherein the at least one expanded opening is in a form of a notch in at least one wall of the main recess, and the at least one expanded opening is configured to permit passage of the at least one secondary protrusion from the outer edge of the guide bar into the at least one secondary internal recess.

* * * * *